United States Patent [19]

Barber et al.

[11] Patent Number: 5,564,369
[45] Date of Patent: Oct. 15, 1996

[54] REEF BALL

[76] Inventors: Todd R. Barber, 7085 Chappell Cir., Doraville, Ga. 30360; Gerald L. Barber, 410 Hudson Rd., Greenville, S.C. 29615

[21] Appl. No.: 264,040

[22] Filed: Jun. 22, 1994

[51] Int. Cl.[6] .............................. A01K 61/00; B28B 7/32
[52] U.S. Cl. ................... 119/221; 405/21; 405/23; 249/65
[58] Field of Search ................... 405/15, 21, 24, 405/25, 27, 30, 23; 249/65, 145; 264/314; 119/221

[56] References Cited

U.S. PATENT DOCUMENTS

| 137,659 | 4/1873 | Cunningham . | |
|---|---|---|---|
| 934,666 | 9/1909 | Goldkamp . | |
| 1,456,058 | 5/1923 | Hale . | |
| 2,270,229 | 1/1942 | Neff . | |
| 2,396,226 | 3/1946 | Aston . | |
| 3,426,109 | 2/1969 | Dempster . | |
| 3,548,600 | 12/1970 | Stolk, Jr. et al. | 405/30 |
| 3,628,334 | 12/1971 | Coleman . | |
| 3,643,910 | 2/1972 | Heifetz . | |
| 3,704,687 | 12/1972 | Nohmura | 119/221 |
| 3,734,670 | 5/1973 | Stickler, Jr. . | |
| 4,239,568 | 12/1980 | Takazawa . | |
| 4,508,057 | 4/1985 | Suzuki . | |
| 4,712,944 | 12/1987 | Rose . | |
| 4,997,311 | 3/1991 | Van Doren | 405/30 |
| 5,215,406 | 6/1993 | Hudson | 405/25 |

FOREIGN PATENT DOCUMENTS

| 3014399 | 6/1968 | Japan | 119/221 |
|---|---|---|---|
| 119815 | 9/1980 | Japan | 405/30 |
| 5236844 | 9/1993 | Japan | 119/221 |
| 8705645 | 9/1987 | WIPO | 405/30 |

Primary Examiner—Tamara L. Graysay
Assistant Examiner—Frederick L. Lagman
Attorney, Agent, or Firm—Dority & Manning

[57] ABSTRACT

The method and apparatus for producing artificial reef modules which can be deposited on the ocean floor for permitting growth of coral and other marine growth thereon. The reef balls can be left permanently at a particular location to develop an artificial reef or can be harvested for use in aquariums.

12 Claims, 9 Drawing Sheets

REEF BALL

BACKGROUND OF THE INVENTION

This invention relates to an artificial reef module and more particularly to a reef ball which can be placed in an underwater environment to permit growth of corals, blue mussels, oysters, encrusting sponges, algae, tunicates, featherdusters, barnacles, and other marine growth that simulates natural leers for promoting the protection and development of schools of various fish and for other marine life. The reef ball can be allowed to remain in the area where it was positioned for development of marine growth, or it can be harvested and transported to other locations such as natural or artificial aquariums.

The effects of man's abuse and natural disasters have led to the significant destruction and reduction of our natural reef systems. All reefs, both natural and artificial serve as food, shelter and protection for a multitude of marina animals and plants, including vital links in the food chain such as crustaceans, sponges, and invertebrates. Because natural reefs cannot rebuild themselves fast enough to Keep up with their destruction rates, the fragile ocean reef system stands in peril.

Since large natural coral structures take thousands of years to develop, one way that man can help the reef system is to put back the essential structure that sustains life. Much like forests replanted on land, artificial reefs must be "planted" on the ocean floor. Efforts have been made to build artificial reefs out of many things such as car tires, construction rubble, ships and planes. Even refuge unsuitable for land fills have been used to make reefs. Unfortunately, many of these methods have turned out to be environmentally unsound, very expensive, or both.

SUMMARY OF THE INVENTION

This invention pertains to a method and apparatus for constructing artificial reefs from hollow structures such as reef balls for attracting marine life such as coral and fish. The method includes producing a separable mold of a shape corresponding to a desired external shape of an exterior wall of the reef ball. An inflatable bladder is placed within the separable mold and is inflated to a shape corresponding to the shape of a desired inner wall of the hollow structure. Small bladders or inflatable balls or forms are positioned between the bladder and the mold for producing holes in the wall of the reef ball. After the balloons or bladders are placed between the main bladder and the mold, the mold is filled with cement and the cement is allowed to assume the shape between the main bladder and the mold upon setting to form a reef ball which is in the form of a rigid hollow structure with holes provided therein.

The mold is then removed from the reef ball and the reef ball is floated via its inflatable center bladder to the desired location in a body of water. Upon reaching the desired location, the bladder is deflated allowing the reef ball or hollow structure to settle to the bottom of the body of water. The internal bladder is then removed from the structure wherein a hollow structure with openings provided therein rests on the bottom of the body of water. The reef ball can be anchored to the bottom by any suitable means so that tides and current will not shift its location.

The reef ball can be allowed to stay submerged for a period of time sufficient to allow marine growth to develop thereon and if desired, the reef ball can be harvested and transported to another location such as aquariums, etc. A pattern can be placed on the interior wall of the mold for simulating coral and the like so that during the setting of the cement when producing the reef ball, the pattern is embossed on the outer or inner surfaces of the reef ball. The holes provided in the outer shell of the reef ball have a concave radially extending area for promoting the growth of algae and the like as a result of providing an area where there is higher and lower flow rates of water. As a result of the concave recesses in the openings provided in the wall, there are areas of the reef ball that receive different amounts of light, currents and surface angles toward the surface. Normally coral grows on the brightly lit areas, and sponges grow on the darker areas.

Accordingly, it is an important object of the present invention to provide an artificial reef ball for promoting marine life.

Another important object of the present invention is to provide an artificial reef ball which can be readily manufactured and transported to desired locations in a body of water.

Another important object of the present invention is to provide a reef ball that can be readily placed in the ocean for promoting the growth of marine life and then harvested and transported to different areas.

Another important object of the present invention is to produce a stable reef ball by locating most of the weight of the reef within one foot of the bottom perimeter of the reef ball.

Still another important object of the present invention is to provide a reef ball which can be readily attached to other reef balls for producing artificial reefs.

DESCRIPTION OF THE PREFERRED EMBODIMENTS

Figure 1:
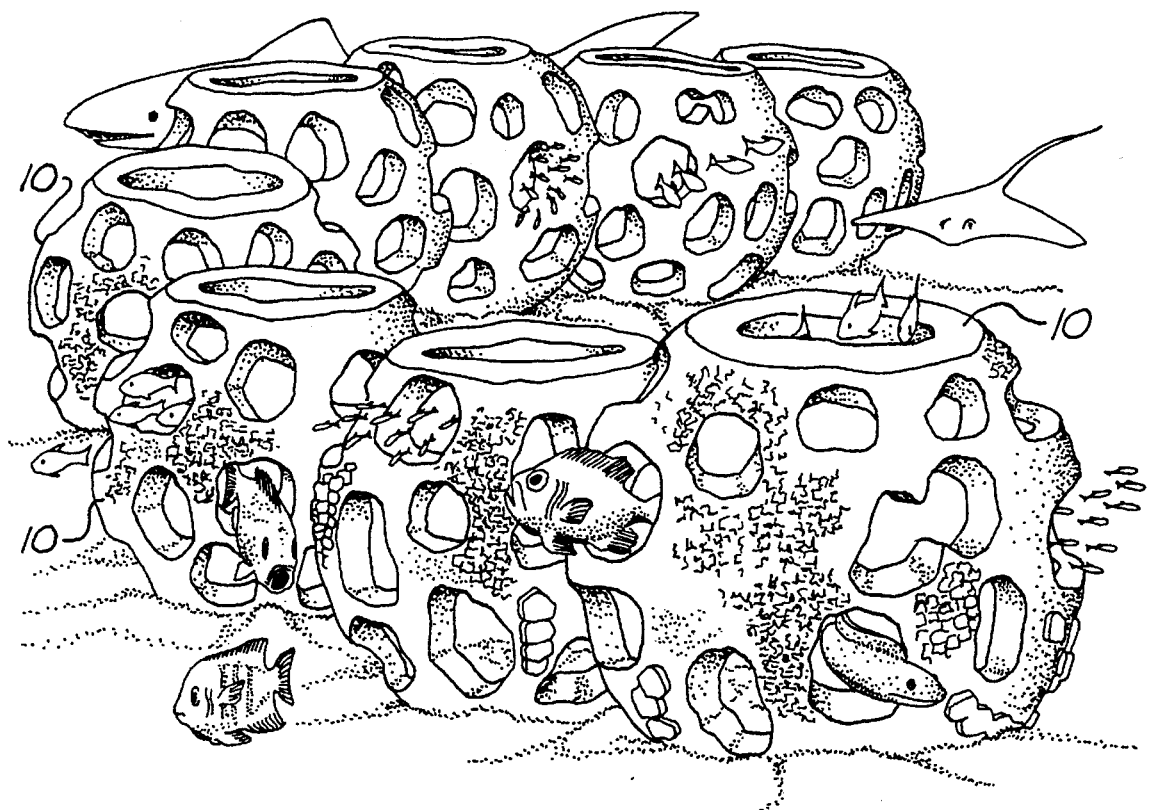
FIG. 1 is a perspective view illustrating a plurality of reef balls constructed in accordance with the present invention positioned on the ocean floor.

FIG. 1 is a perspective view illustrating a plurality of reef balls anchored on the bottom of the ocean floor to produce a reef which is used for promoting the growth of marine life such as encrusting sponges, algae, tunicates, featherdusters, barnacles, etc. and for attracting and protecting various fish species. The reef balls may be constructed out of any suitable concrete mix that is compatible to a marine life. A key aspect of the concrete mix is the use of microsilics, superplastisizer, and fibers. These admixes will turn nearly any concrete into a suitable mix for reef balls. A minimum of 25 pounds of microsilics is required for every yard on concrete. One and a half pounds or more of fibers are used for flexural strength and shipping resistance. Non-toxic superplastisizer (liquid or powder) is used to achieve a minimum of a seven inch slump. Normally mixes utilizing as low a sulphur content as possible are desired. In one particular embodiment, three eighths inch aggregate is utilized. The size of the aggregate can vary depending on the size of the reef ball.

Figure 2:
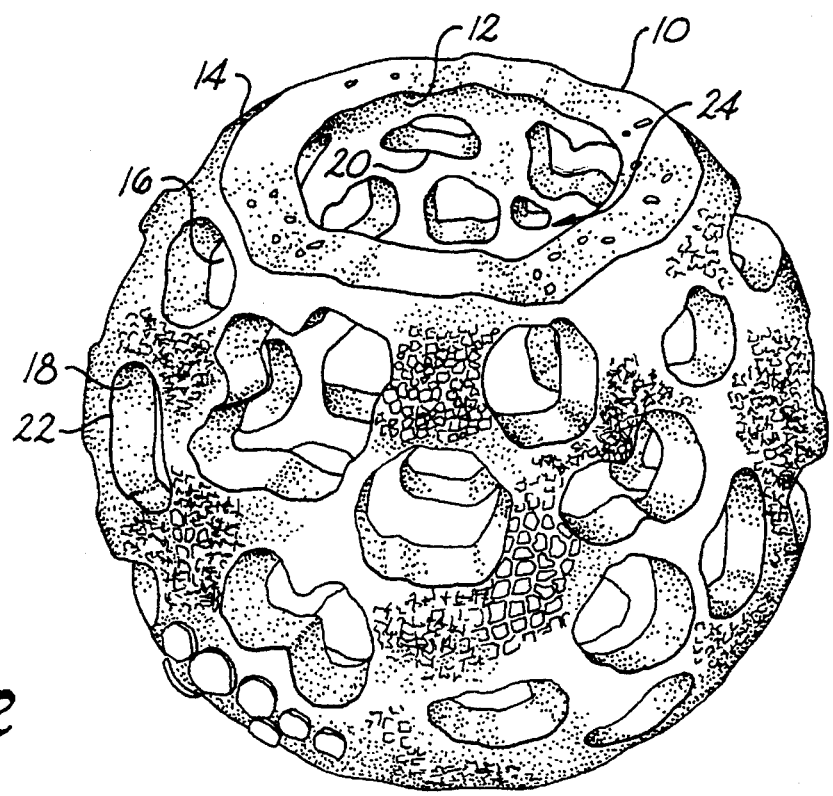
FIG. 2 is an enlarged perspective view of an individual reef ball.
Figure 3:
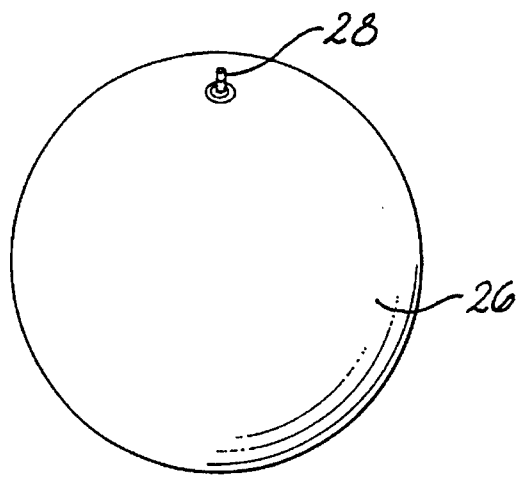
FIG. 3 is a perspective view of a bladder that is used in constructing the reef ball of FIG. 2.

The reef ball 10 as shown in FIGS. 1 and 2 includes a generally spherical shell formed of cementitious material. The shell has an inner wall 12 and an outer wall 14. Holes 16 are provided in the spherical shell to permit ingress and egress of fish and the like into the interior of the spherical shell. The holes 16 have concave components 18 which provide a recess in which algae grows as a result of the flow rate of water thereover being slower than through the center portion of the hole.

The holes 16 have an inlet 20 on the inner surface and an outlet 22 on the outlet surface. Between the inlet 20 and the outlet there is a concave recess extending around the hole. As a result, the exterior surface of the reef ball is more exposed to light than the recessed concave surfaces 18. Coral normally grows on the portion of the reef ball that is more exposed to light whereas sponges and algae tend to grow and locate on the portions of the reef ball that are exposed to less light.

The upper portion of the reef ball has a generally circular opening 24 provided therein.

When the reef balls are deposited on the ocean floor or the like, if there is water flow or current then they should be anchored to the bottom by any suitable anchoring system. As shown in FIG. 1, several of the reef balls may be connected together to form a large reef.

The manner in which the reef ball is constructed and deployed is disclosed in FIGS. 3 through 10.

Figure 10:
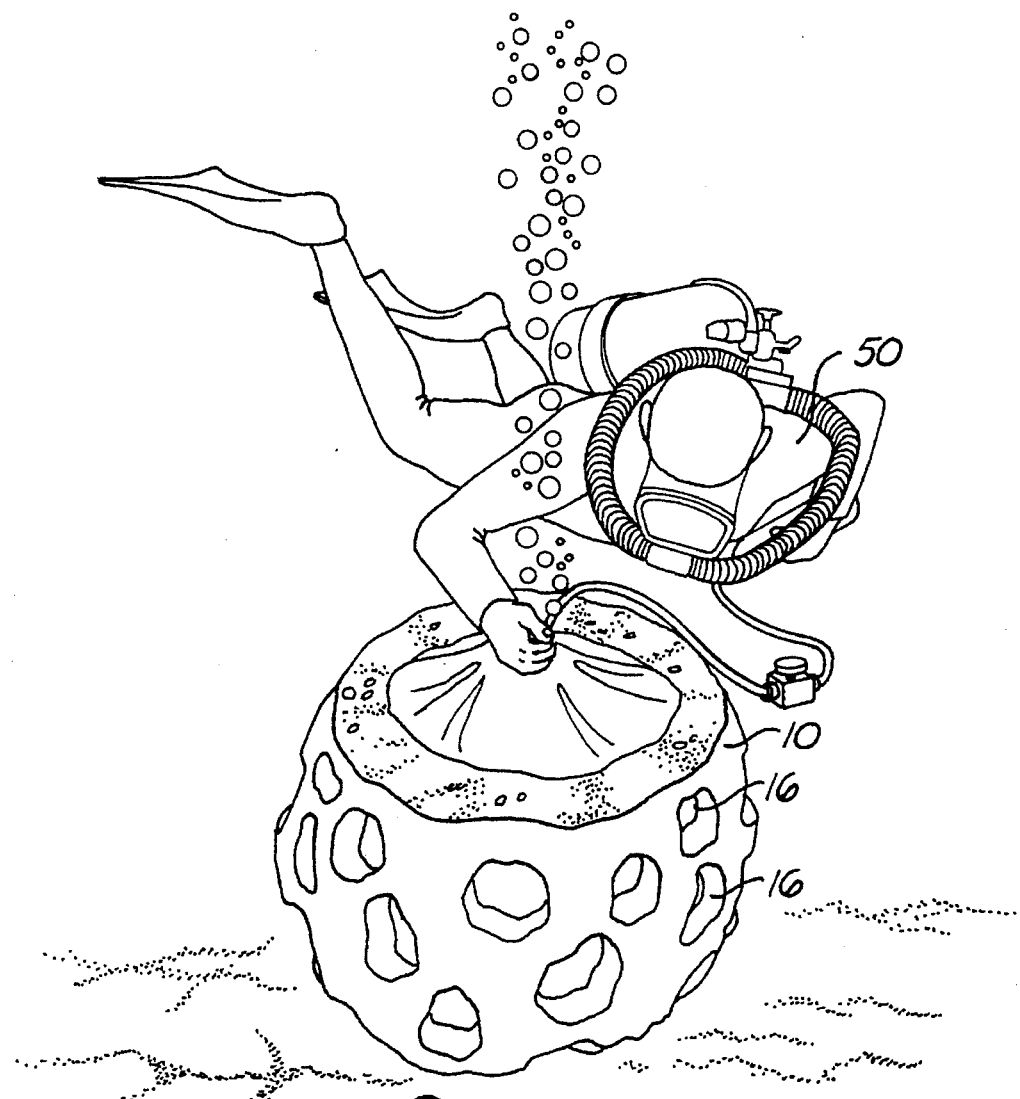

As shown in FIG. 10, there is an inflatable bladder 26 that is used in forming the reef ball. The bladder 26 has a valve stem 28 provided thereon so as to control the flow of air into the bladder for expanding it and for exhausting the bladder when it is desired that it be collapsed. When diver-less deployments are required, the valve stem is fitted with a long hose with a quick disconnect for deploying reef balls without diver's aid from the surface of the water. A small buoy is attached to the internal bladder to allow the internal bladder to float to the surface after the air is released from the surface via the long hose. Bladder 26 can be filled with air from any suitable means such as a diver's tank. If it is used in connection with a diver's tank, then it should have a valve stem and connection compatible with the tubes provided on the diver's tank.

Figure 4:
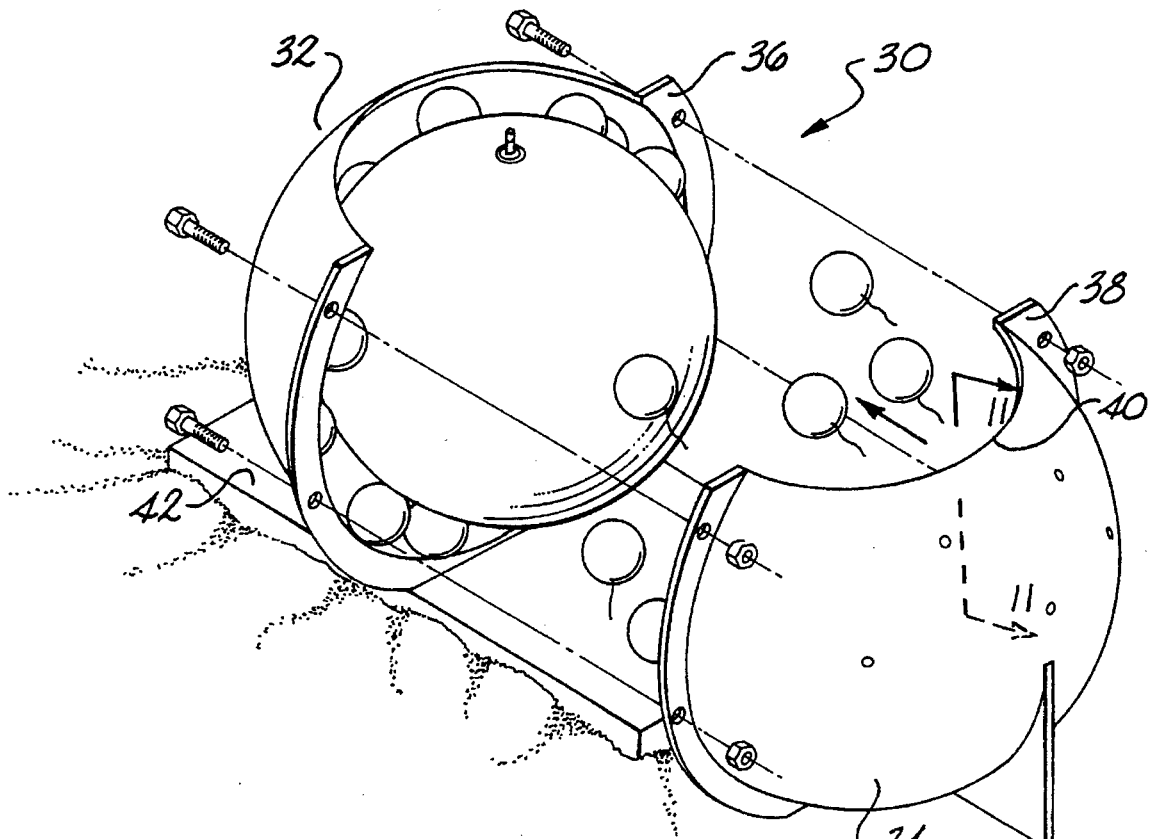
FIG. 4 is an exploded perspective view of a mold used for constructing a reef ball.

FIG. 4 discloses a mold generally designated by the reference character 30 that is capable of producing the reef ball of FIGS. 1 and 2. The mold as shown in FIG. 2 includes semi-circular spherical bodies 32 and 34 each of which is provided with connecting flanges 36 and 38 respectively. The top of the mold is open as defined by the circular opening 40. The mold can be positioned on any suitable support platform such as a wooden platform 42.

The semi-circular spherical bodies 32 and 34 which form the mold have small holes provided therein through which strings are attached to small bladders, balloons, or tether balls 48 so that the small bladders 48 can be attached to the inside wall of the molds by feeding the strings 48A through the holes 33 in the mold for attaching the small bladders to the inside wall of the spherical bodies 32 and 34. The strings 48A are tied tightly so as to hold the bladders or tether balls tightly against the inner surface of the spheres 32 and 34 during the pouring of the concrete.

Figure 5:
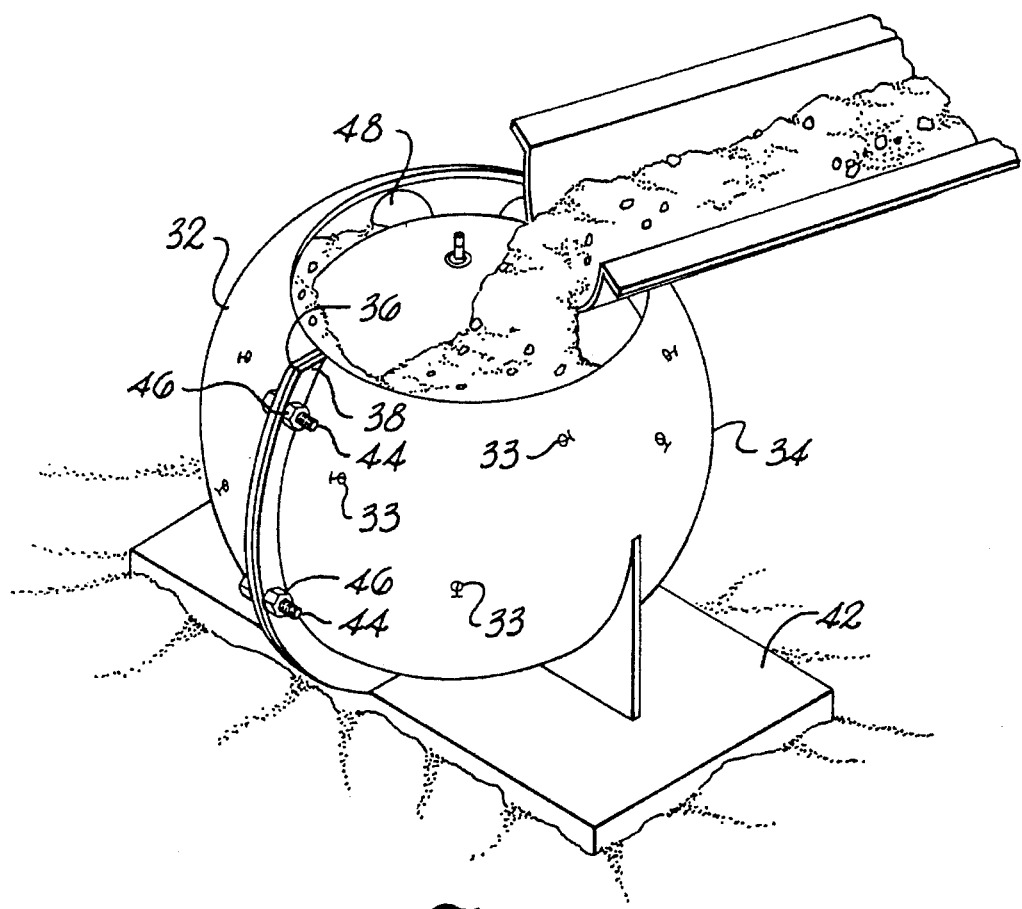
FIG. 5 is a perspective view illustrating a reef ball being constructed.
Figure 6:
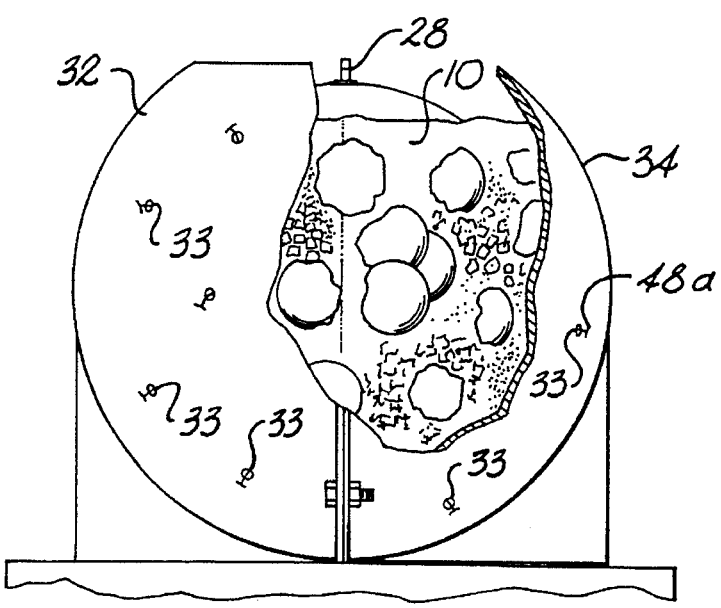
FIG. 6 is an elevational view with parts broken away illustrating a reef ball being molded.

The bladder 26 is then inserted within the mold as shown in FIG. 5, and bolts or pins are inserted through the flange members 36 and 38 for securing the two halves together by means of nuts 46. When the bladder is in place, the bladder is fully inflated and presses the small balloons or bladders 48 against the inner wall of the mold. The small balloons or bladders 48 provide a space between the outer surface of the inner bladder 10 and the interior wall of the mold so that concrete can be poured therearound. The balloons 48 aid in holding the bladder away from the walls of the mold during the concrete pouring process. When the concrete is poured into the mold as shown in FIG. 5, it incapulates the small tether balls 48 and fills in the space between the main bladder 10 and the interior wall of the mold. In some instances rather than utilizing cylindrical shaped balloons, other various shaped forms can be positioned between the bladder and the interior of the wall for forming voids in the concrete once it sets. For example, elongated cylindrical boat buoys can be positioned between the bladder 10 and the interior wall of the mold to create elongated voids in the shell of the reef ball for attracting lobsters and the like.

Figure 14:
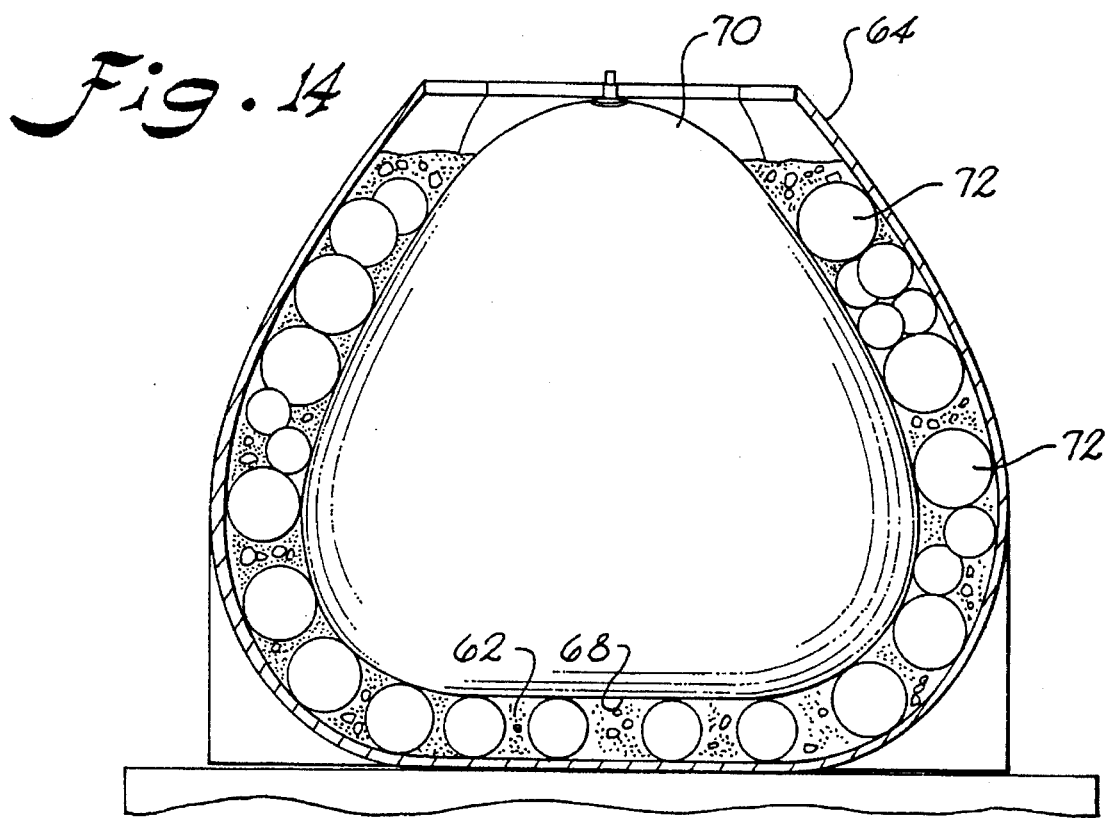
FIG. 14 is a cross-sectional view taken all along line 14 of FIG. 13.

The bladder can have a connecting strap positioner adjacent to the bottom thereof which can be tied to the bottom of the mold so that it will be anchored down when the concrete is poured into the mold. The tie down strap adjacent to the bottom portion of the bladder 46 is not shown in FIGS. 4 through 8, but it is shown in the bladder of FIG. 14. If additional strength is desired for the reef ball, the mold can be constructed so as to form reinforcing ribs on the exterior of the reef ball.

Figure 7:
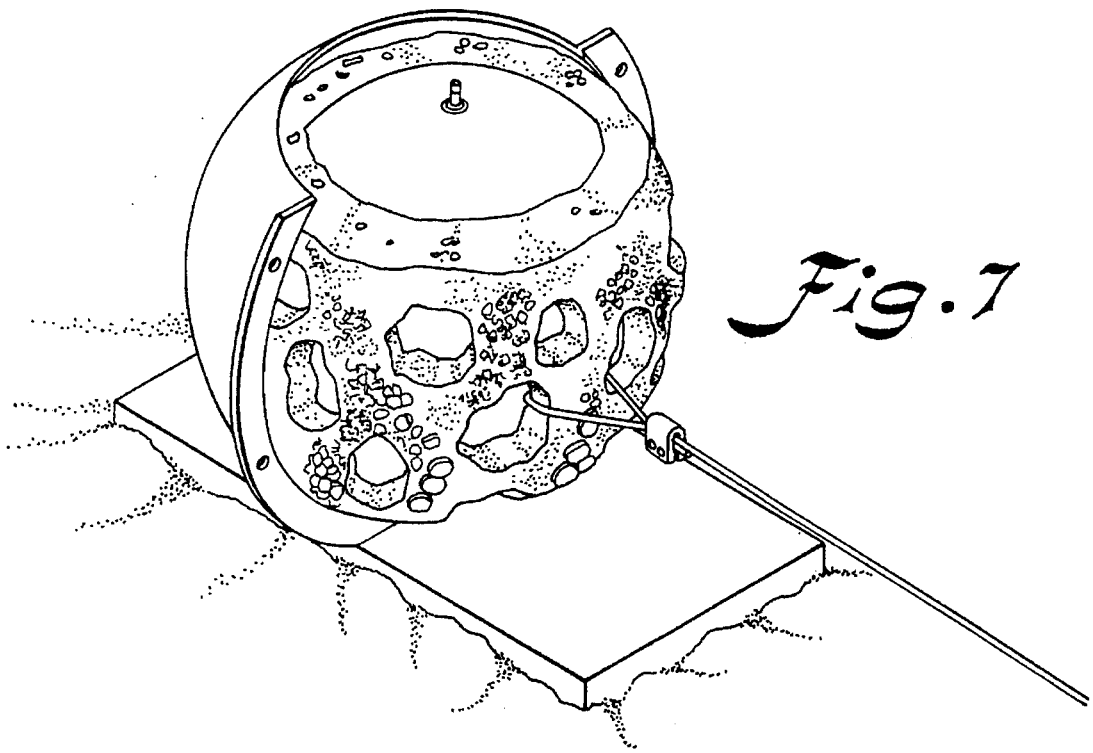
FIG. 7 is a perspective view illustrating a reef ball being removed from a mold.
Figure 8:
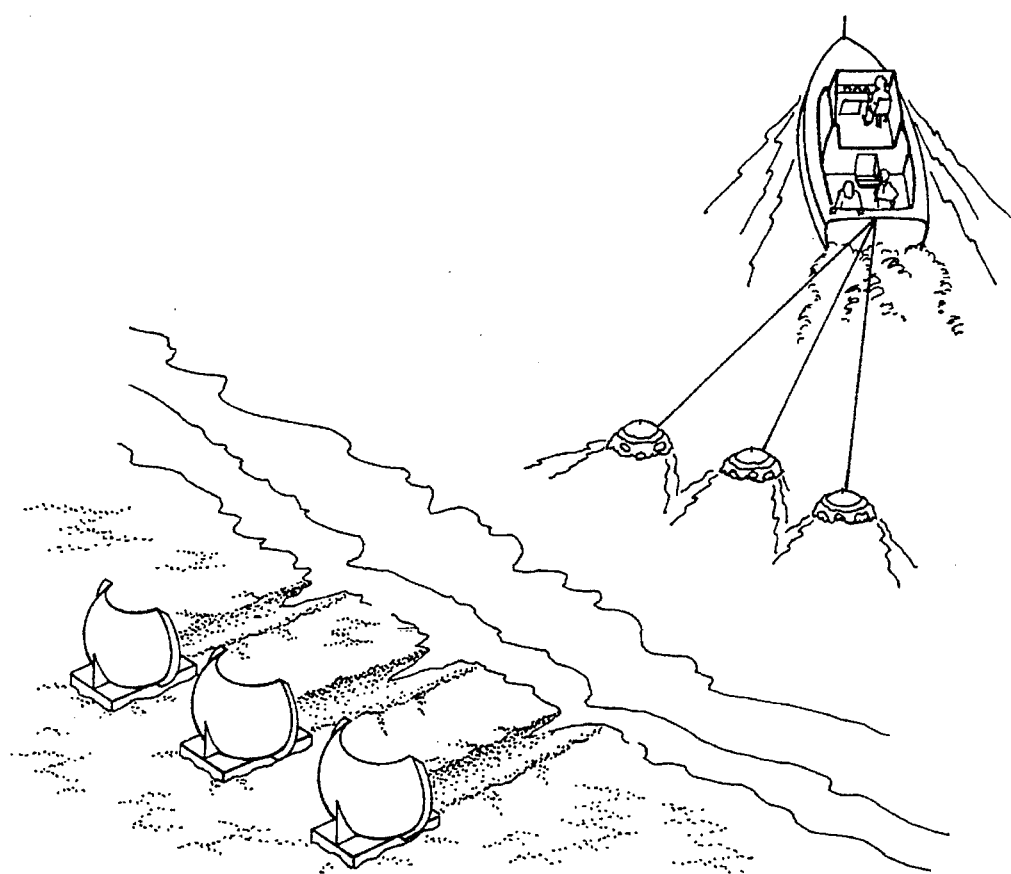
FIG. 8 is a perspective view illustrating a plurality of reef balls being transported to a desired location.
Figure 9:
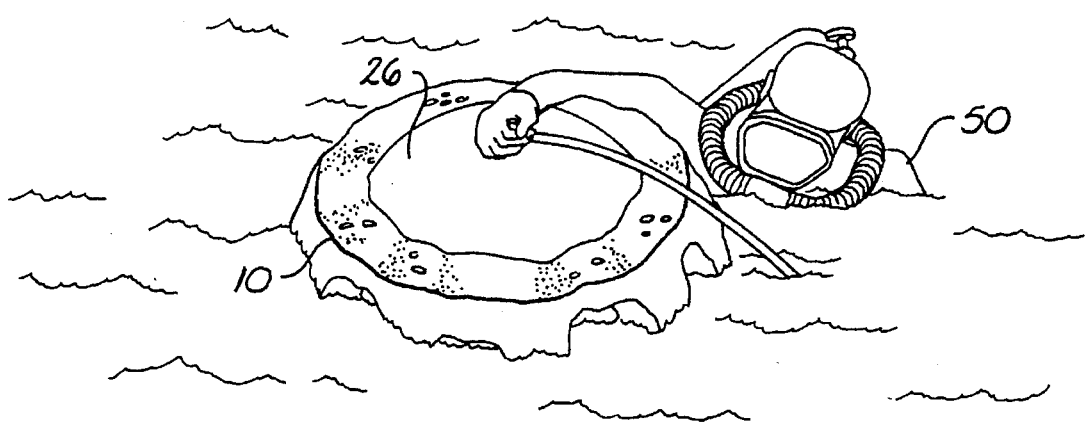
FIGS. 9 and 10 are perspective views illustrating a diver lowering a reef ball to the bottom of the ocean.

After the two sides of the mold are secured together such as shown in FIG. 5, a cement truck or any suitable source of cement can be backed up to the mold and cement poured directly through the opening in the top of the mold and allowed to flow around the centrally located bladder 28. As the cement works down towards the bottom of the mold it encapsulates the balloons 48 which causes the holes to be formed in the outer shell of the reef ball. Once the cement sets, the two halves of the mold are separated such as shown in FIG. 7, and the reef ball 10 can be connected to a tow line and removed from the mold. The reef balls can either be rolled down to the surface of the water where they are to be deployed or transported there by other suitable means. Once the reef balls have been moved to the surface of the water, they will float on top of the water as long as the bladder 26 is inflated. This permits a boat such as in FIG. 8 to pull the reef balls to the desired location where they are to be set on the bottom. Once they reach the desired location, a diver generally designated by the reference character 50 can allow the air to be expelled from the bladder 26 by manipulating a valve provided in the valve stem 28. This permits the reef ball with the bladder then to slowly sink to the bottom of the ocean floor. If for some reason once the reef ball reaches the ocean floor it is desired to move it to another location, the diver can merely supply compressed air to the bladder to increase its buoyancy.

In one particular test, after a reef ball was allowed to rest on the ocean bottom for approximately four months, it was found that the ball was covered with encrusting sponges, algae, tunicates, featherdusters, barnacles, and other types of marine life. In addition, many varieties of fish were found in and around the reef ball. The reef balls can be allowed to remain at the location where they were first deposited and form a permanent reef, or the reef balls can be harvested after they have developed their encrustations and transported to some other location such as an aquarium.

Figure 11:
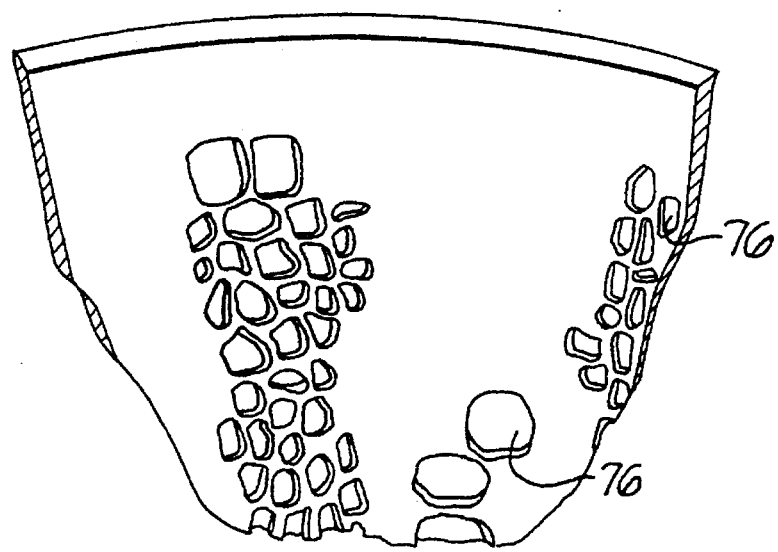
FIG. 11 is a fragmentary side elevational view illustrating a portion of the wall of a reef ball.
Figure 12:
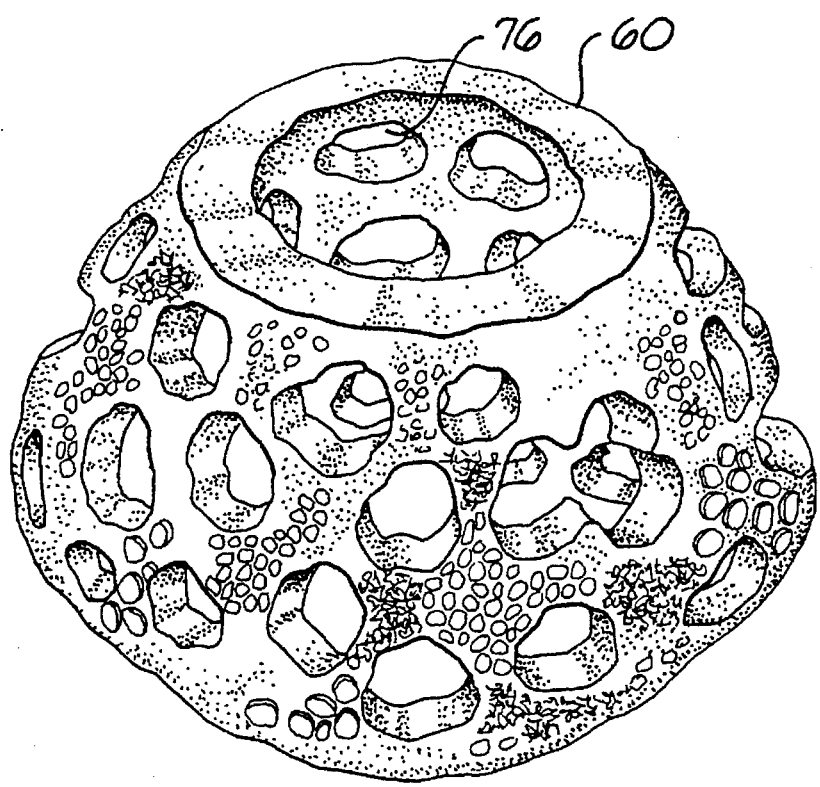
FIG. 12 is a perspective view illustrating a reef ball having a different shape.

FIGS. 11, 12, 13, and 14 disclose a reef ball constructed in the same manner as the reef ball of FIGS. 1 through 6 but it has a different shape. As can be seen in FIGS. 12 and 14, the reef ball 60 has a substantially bell shaped or mound-like configuration. Often a bottom flange is added to the shape to reduce scour of the sand/mud from under the reef ball. A substantial amount of cement 62 is deposited adjacent to the bottom of the mold for adding weight to the bottom portion of the reef ball.

Figure 13:
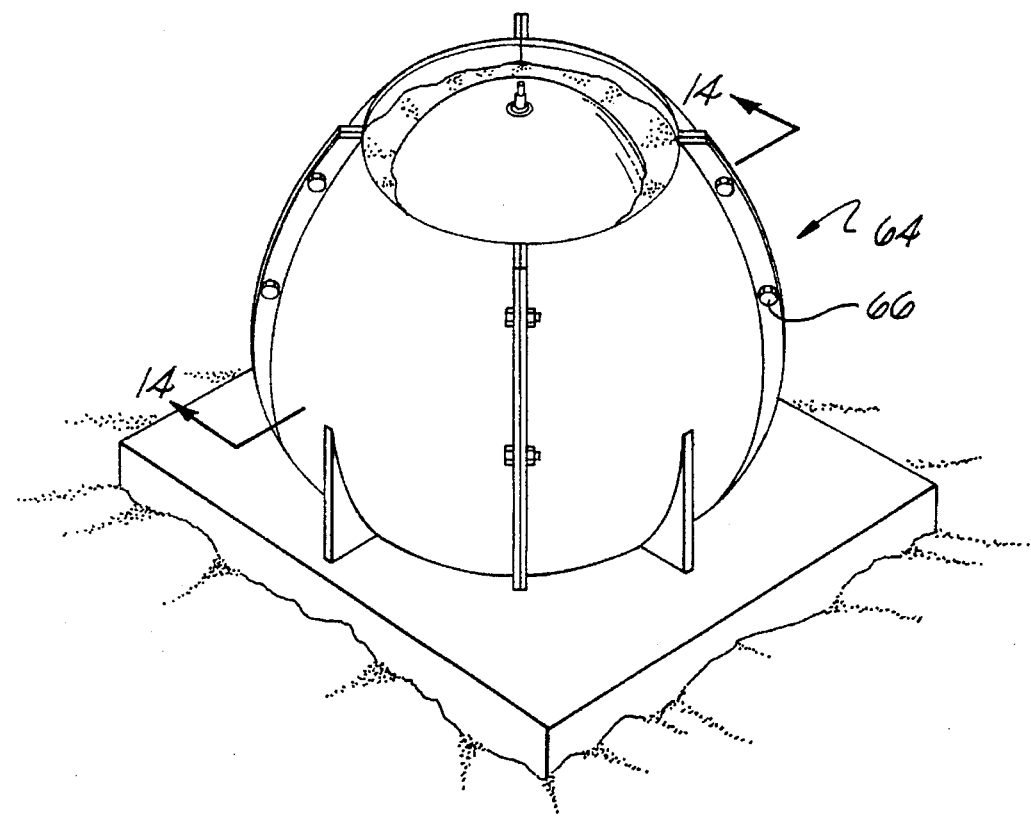
FIG. 13 is a perspective view illustrating a different type of a mold being used for producing a reef ball of the configuration shown in FIG. 12.

The reef balls of FIGS. 11, 12, and 13 were constructed in a four piece mold generally designated by the reference character 64 which is bolted or pinned together by bolts or pins 66 in the same manner as the reef ball mold of FIGS. 1 and 2. An optional tie down 68 extends from the bottom of the tear shaped bladder 70 for holding the bladder down within the mold during the pouring of cement therein. The cement is filled in the top and surrounds the balloons 72 which are used for holding the main bladder 70 away from the side walls of the mold and also for forming the holes 76 provided in the shell of the reef ball. Different size balloons can be used to produce different size holes in the shell of the reef ball. While heretofore reference has been made to utilizing balloons between the main bladder 70 and the shell of the mold 64, it is to be understood that any suitable inflatable device or form could be utilized, as long as it is of sufficient strength not to rupture under the pressure of the cement being poured therein.

The main bladder as well as the balloon may be constructed of reinforced urethane corded nylon fabric or any other conventional suitable bladder material. It is to be understood that other types of hole forming devices could be used.

The inner surface of the mold 64 in some situations is embossed with a pattern to correspond to the pattern of coral so that when the concrete is poured within the mold, the outer surface of the concrete will have a coral pattern embedded therein. Other textured surfaces could be imparted to the outer surface of the reef ball either during the molding process or prior to the concrete completely setting by etching patterns into the surface of the reef ball. One such surface is made by applying a surface retardant to the surfaces of the molds, bladders and ball then rinsing the outside layer of concrete with water to expose the underlying aggregate.

Figure 15:
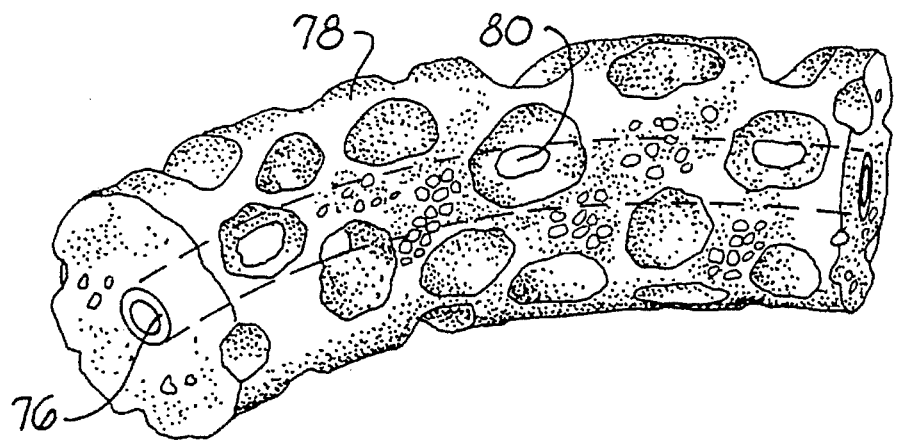
FIG. 15 is a perspective view showing a portion of a connecting mechanism for connecting a plurality of reef balls together.
Figure 16:
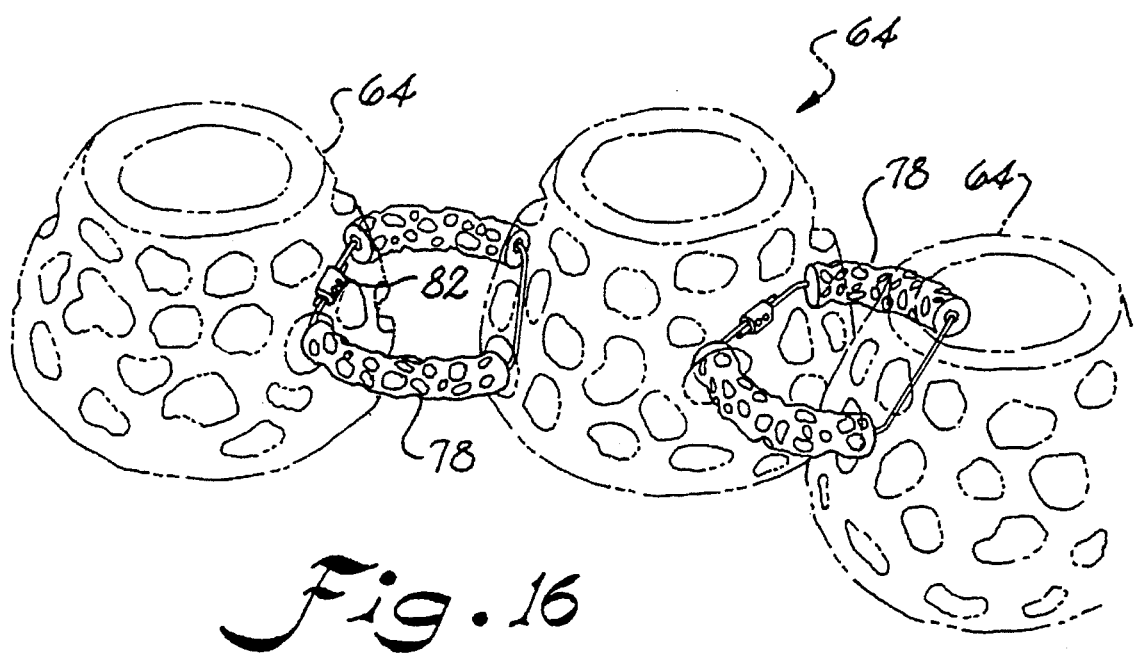
FIG. 16 is a perspective view illustrating the manner in which a plurality of reef balls are connected together to form a reef.

When it is desired to connect several reef balls together to form a large reef, a connecting member such as shown in FIG. 15 can be utilized. This connecting member includes a polyurethane pipe 76 which has layers of cement 78 attached thereto with holes 80 provided therein. A cable 82 can be extended through the polyurethane pipe 76 for securing the individual reef balls 64 together.

Figure 17:
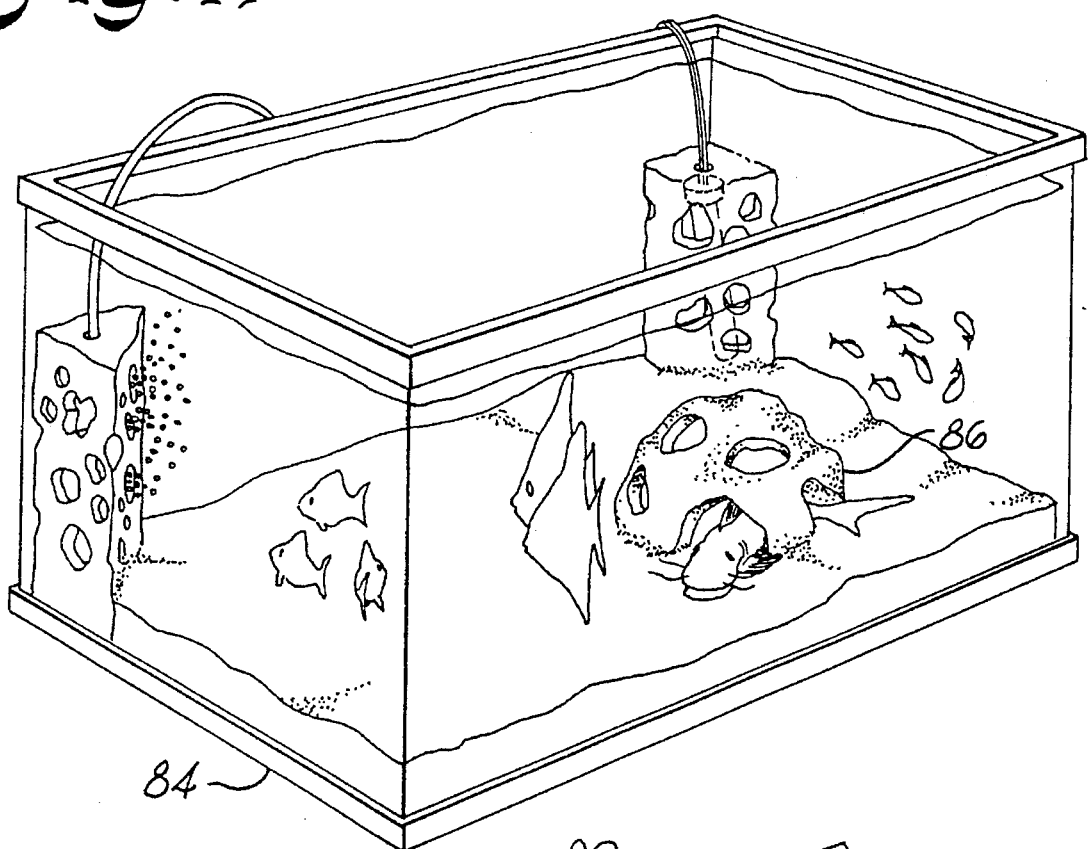
FIG. 17 is a perspective view illustrating a small reef ball that has been harvested and placed within an aquarium.

In FIG. 17 there is illustrated an aquarium 84 which has a small reef ball 86 constructed in accordance with the present invention placed therein. The reef ball is encrusted with marine life as a result of being placed on the bottom of an ocean floor for a period of time and harvested.

Figure 18:
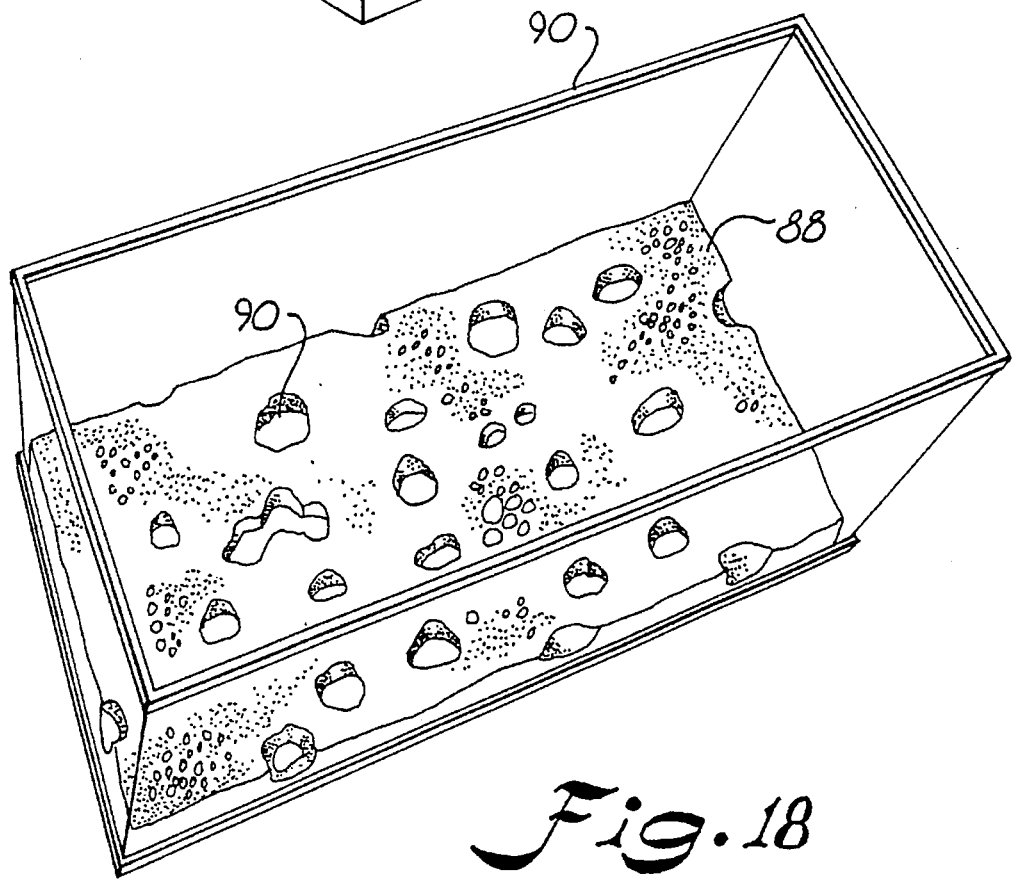
FIG. 18 is a perspective view of a modified form of the invention illustrating a reef structure positioned within an aquarium.

In FIG. 18 a substantially rectangular reef 88 is placed on the bottom of an aquarium 90. The rectangular reef 88 is constructed of cementitious material and has holes 90 provided therein. These slabs of material can be placed in the ocean until they become encrusted with marine life. They can then be harvested and transported for use in salt water aquariums.

While the preferred embodiments and the invention have been described using specific terms, such description is for illustrative purposes only, and it is to be understood that changes and variations may be made without departing from the spirit or scope of the following claims.

What is claimed is:

1. The method of constructing artificial reefs from hollow structures for attracting marine life such as coral and fish comprising the steps of:

producing a separable mold of a shape corresponding to a desired external shape of an exterior wall of said hollow structure, placing an inflatable bladder in said mold;

inflating said bladder to a shape corresponding to the shape of a desired interior wall of said hollow structure, placing hole forming structures between said bladder and said mold at desired locations, filling the space between said bladder and said mold with cement, allowing said cement to assume the shape of the spaced between said bladder and said mold and upon setting producing a rigid hollow structure with holes provided therein, removing said mold from said hollow structure, floating said hollow structure with said inflated bladder therein to a desired location in a body of water, deflating said bladder allowing said hollow structure to settle on the bottom of said body of water, and removing said bladder from said structure wherein a hollow structure with openings provided therein rest on the bottom of said body of water for attracting marine life.

2. The method as set forth in claim 1 further comprising:

attaching a plurality of said hollow structures together for stabilizing said reef on the bottom.

3. The method as set forth in claim 1 further comprising:

attaching a valve to said bladder so that air can be introduced into and removed from said bladder, using a source of air attached to said valve for varying the air pressure in said bladder to change the buoyancy of said hollow structure when floating said structure and allowing said structure to settle on the bottom of said body of water.

4. The method as set forth in claim 1 wherein said step of placing said hole forming structure between said bladder and said mold includes placing inflatable devices between said mold and said bladder for causing holes to be produced in the wall of said hollow structure for providing access to the interior of said hollow structure.

5. The method as set forth in claim 1 further comprising:

placing a pattern on an interior wall of said mold simulating coral which pattern is impressed into an exterior wall of said hollow structure as said concrete sets.

6. An artificial reef system comprising:

a generally spherical shell, said shell being formed of cementitious material, holes provided in said shell for providing ingress and egress of fish into the interior of said spherical shell, an inflated bladder attached to said shell for making said shell buoyant so that said spherical shell can be floated to a desired location whereupon said bladder can be deflated for allowing said spherical shell to be deposited on the bottom of said body of water.

7. The artificial reef system as set forth in claim 6 further comprising:

a pattern corresponding to coral embossed an outer surface of said spherical shell.

8. The artificial reef system as set forth in claim 6 further comprising:

a plurality of cementitious shells, and link members connecting said plurality of shells together forming a reef.

9. The artificial reef system as set forth in claim 6 further comprising:

said bladder being positioned in said spherical shell, and an opening provided in an upper portion of said spherical shell so that said bladder can be removed from said shell upon being deflated.

10. An artificial reef for promoting the growth of marine life on the surface thereof while submerged in a body of water so that said reef with said growth thereon can be harvested and transported to another location comprising:

a substantially spherical structure having an exterior surface and an interior surface, a cavity provided in said structure, holes provided in said structure for providing ingress and egress to fish into said cavity, said holes having an inlet and an outlet and a concave radially extending surface defined between said inlet and outlet of said holes, and said wall being constructed of cementitious material adapted to support marine growth thereon.

11. The artificial reef as set forth in claim 10, further comprising:

said concave radially extending surfaces being positioned between said interior and said exterior surface of said spherical structure for producing a darker area as compared to the exterior surface of said reef.

12. The artificial reef as set forth in claim 11 wherein said concave radially extending surfaces define recessed surfaces having a greater diameter than the diameter of said inlet and outlet of said holes provided in the interior and exterior surfaces of said spherical structure.

* * * * *